US009653726B2

United States Patent
Lee et al.

(10) Patent No.: US 9,653,726 B2
(45) Date of Patent: May 16, 2017

(54) RECHARGEABLE LITHIUM BATTERY COMPRISING POSITIVE ELECTRODE COMPRISING SACRIFICIAL POSITIVE ACTIVE MATERIAL

(71) Applicant: Samsung SDI Co., Ltd., Yongin-si, Gyeonggi-do (KR)

(72) Inventors: Soon-Rewl Lee, Yongin-si (KR); Ick-Kyu Choi, Yongin-si (KR); Young-Ki Kim, Yongin-si (KR); Young-Hun Lee, Yongin-si (KR); Na-Leum Yoo, Yongin-si (KR); Na-Ri Park, Yongin-si (KR); Yong-Chul Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 256 days.

(21) Appl. No.: 13/949,177

(22) Filed: Jul. 23, 2013

(65) Prior Publication Data

US 2014/0220455 A1     Aug. 7, 2014

(30) Foreign Application Priority Data

Feb. 6, 2013    (KR) ................... 10-2013-0013420

(51) Int. Cl.
    *H01M 6/04*         (2006.01)
    *H01M 4/36*         (2006.01)
    (Continued)

(52) U.S. Cl.
    CPC ........... *H01M 4/364* (2013.01); *H01M 4/386* (2013.01); *H01M 4/485* (2013.01); *H01M 4/587* (2013.01);
    (Continued)

(58) Field of Classification Search
    CPC .. H01M 4/386; H01M 4/587; H01M 10/0525; H01M 4/364; H01M 10/0569; H01M 4/485; H01M 10/0568; Y02E 60/122
    USPC .... 429/331, 188, 199, 223, 231.1, 326, 329, 429/330, 332, 337, 338, 339, 340, 341, 429/342
See application file for complete search history.

(56) References Cited

U.S. PATENT DOCUMENTS 7,521,152 B2    4/2009   Takeda et al.
7,767,342 B2    8/2010   Nakai et al.
(Continued)

FOREIGN PATENT DOCUMENTS

JP        2003-123740 A     4/2003
KR    10-2001-0090406 A    10/2001
(Continued)

OTHER PUBLICATIONS

KIPO Office action dated Jul. 6, 2016, for corresponding Korean Patent Application No. 10-2013-0013420 (7 pages).
(Continued)

*Primary Examiner* — Gary Harris

(57) ABSTRACT

A rechargeable lithium battery including a negative electrode including a silicon-based negative active material; a positive electrode including a positive active material including a sacrificial positive active material selected from lithium nickel oxides, lithium molybdenum oxides, and combinations thereof; and a non-aqueous electrolyte, is disclosed.

12 Claims, 2 Drawing Sheets

(51) Int. Cl.
*H01M 10/0569* (2010.01)
*H01M 4/485* (2010.01)
*H01M 4/38* (2006.01)
*H01M 4/587* (2010.01)
*H01M 10/0525* (2010.01)
*H01M 10/0568* (2010.01)

(52) U.S. Cl.
CPC ... *H01M 10/0525* (2013.01); *H01M 10/0568* (2013.01); *H01M 10/0569* (2013.01)

(56) References Cited

U.S. PATENT DOCUMENTS

| | | | |
|---|---|---|---|
| 8,080,335 B2 | 12/2011 | Kawakami et al. | |
| 8,349,499 B2 | 1/2013 | Oh et al. | |
| 8,388,922 B2 | 3/2013 | Sotowa et al. | |
| 2006/0051675 A1* | 3/2006 | Musha | H01M 4/134 |
| | | | 429/231.95 |
| 2007/0077496 A1 | 4/2007 | Scott et al. | |
| 2007/0141470 A1 | 6/2007 | Nakura | |
| 2007/0148550 A1* | 6/2007 | Hasegawa et al. | 429/245 |
| 2009/0325072 A1* | 12/2009 | Maeda | H01M 4/364 |
| | | | 429/220 |
| 2010/0279172 A1 | 11/2010 | Hwang et al. | |
| 2010/0285374 A1* | 11/2010 | Lee et al. | 429/324 |
| 2011/0200876 A1 | 8/2011 | Park | |
| 2012/0009468 A1 | 1/2012 | Choi et al. | |
| 2012/0021287 A1 | 1/2012 | Lee et al. | |
| 2012/0094191 A1 | 4/2012 | Yoon et al. | |
| 2013/0004846 A1* | 1/2013 | Kim et al. | 429/213 |

FOREIGN PATENT DOCUMENTS

| | | | |
|---|---|---|---|
| KR | 2003-0033492 A | 5/2003 | |
| KR | 10-2006-0050755 A | 5/2006 | |
| KR | 10-2007-0008110 A | 1/2007 | |
| KR | 10-2007-0033880 A | 3/2007 | |
| KR | 10-2007-0064400 A | 6/2007 | |
| KR | 10-0736909 B1 | 7/2007 | |
| KR | 10-2008-0053399 A | 6/2008 | |
| KR | 10-2009-0053660 A | 5/2009 | |
| KR | 10-2009-0074429 A | 7/2009 | |
| KR | 10-2010-0002107 | 1/2010 | |
| KR | 10-2010-0097622 A | 9/2010 | |
| KR | 10-2010-0118825 | 11/2010 | |
| KR | 10-2011-0058507 A | 6/2011 | |
| KR | 10-2011-0094980 | 8/2011 | |
| KR | 10-2012-0009701 | 2/2012 | |

OTHER PUBLICATIONS

KIPO Notice of Allowance dated Feb. 23, 2017, for corresponding Korean Patent Application No. 10-2013-0013420 (6 pages).

* cited by examiner

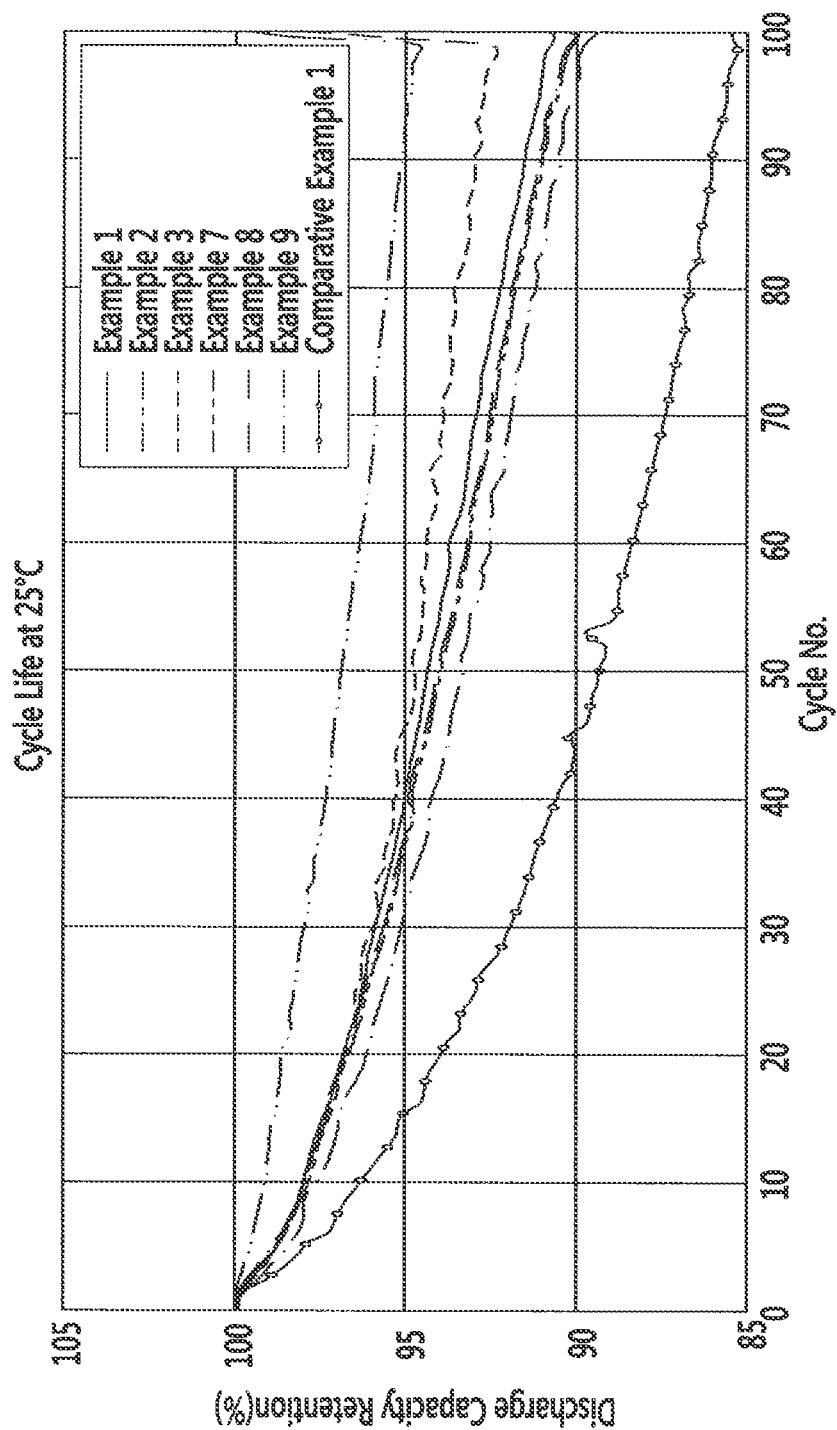

RECHARGEABLE LITHIUM BATTERY COMPRISING POSITIVE ELECTRODE COMPRISING SACRIFICIAL POSITIVE ACTIVE MATERIAL

CROSS-REFERENCE TO RELATED APPLICATION

This application claims priority to and the benefit of Korean Patent Application No. 10-2013-0013420 filed in the Korean Intellectual Property Office on Feb. 6, 2013, the entire contents of which are incorporated herein by reference.

BACKGROUND

1. Field

A rechargeable lithium battery is disclosed.

2. Description of the Related Art

Lithium rechargeable batteries have recently drawn attention as a power source for small portable electronic devices. They use an organic electrolyte and thereby have twice the discharge voltage of a conventional battery using an alkali aqueous solution, and accordingly have high energy density.

As for a positive active material for a lithium rechargeable battery, lithium-transition metal oxides being capable of intercalating lithium, such as $LiCoO_2$, $LiMn_2O_4$, $LiNi_{1-x}Co_xO_2$ (0<x<1), and the like, have been researched. As for a negative active material for a lithium rechargeable battery, various carbon-based materials such as artificial graphite, natural graphite, and hard carbon capable of intercalating and deintercalating lithium ions have been used.

Since graphite among the carbon-based materials has a low discharge potential relative to lithium of about −0.2V, a battery using graphite as a negative active material has a high discharge voltage of about 3.6V and excellent energy density.

Furthermore, graphite typically provides a long cycle life for a battery due to its outstanding reversibility, so graphite is often used as a negative active material. However, graphite negative active materials have a low density (e.g., a theoretical density of about 2.2 g/cc) and, consequently, a low capacity in terms of energy density per unit volume.

Further, a battery including a graphite negative active material may swell, which may result in decreased capacity, because graphite is likely to react with an organic electrolyte at a high discharge voltage. In order to solve (or lessen) these problems, a great deal of research on an oxide negative active material such as tin oxide, lithium vanadium-based oxide, and the like has recently been performed. However, those oxide negative active materials still do not realize sufficient cell performance.

SUMMARY

Aspects of embodiments according to the present invention are directed toward improving a rechargeable lithium battery to have improved capacity, efficiency, and cycle-life characteristics.

In one embodiment of the present invention, a rechargeable lithium battery includes a negative electrode including a silicon-based negative active material; a positive electrode including a positive active material including a sacrificial positive active material selected from lithium nickel oxides, lithium molybdenum oxides and combinations thereof; and a non-aqueous electrolyte.

The sacrificial positive active material may be adapted to deintercalate Li ions at a voltage from about 2.75 to about 4.3V.

The sacrificial positive active material may be one selected from $Li_2NiO_2$, $Li_2MoO_3$, and a combination thereof.

The sacrificial positive active material may be included in an amount of more than 0 and less than or equal to 20 wt % based on 100 wt % of the positive active material.

The silicon-based negative active material may silicon oxide represented by $SiO_x$ and $0.5 \leq x \leq 1.5$.

The silicon-based negative active material may be mixed with a carbon-based negative active material.

The carbon-based negative active material may include graphite.

The silicon-based negative active material may be included in an amount of more than 0 and less than or equal to 10 wt % based on 100 wt % of the negative active material.

The silicon-based negative active material may be included in an amount of more than 0 and less than or equal to 10 wt % based on 100 wt % of the negative active material, and the sacrificial positive active material may be included in an amount from about 5 wt % to about 15 wt % based on 100 wt % of positive active material.

In another embodiment of the present invention, a rechargeable lithium battery includes a positive active material including a mixture of a lithiated intercalation compound and the sacrificial positive active material.

The non-aqueous electrolyte may include a lithium salt and a non-aqueous organic solvent.

The lithium salt may include a non-fluorine-based salt.

The lithium salt may be selected from $LiClO_4$, $LiB(C_2O_4)_2$ (lithium bis(oxalato)borate; LiBOB), a supporting electrolyte salt thereof, and a combination thereof.

The non-aqueous organic solvent may be selected from dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, dibutyl ether, tetraglyme, diglyme, dimethoxyethane, 2-methyltetrahydrofuran, tetrahydrofuran, cyclohexanone, nitriles dimethylformamide, dioxolanes, sulfolanes, and a combination thereof.

In some embodiments, the non-aqueous organic solvent does not include dimethyl carbonate.

According to aspects of embodiments of the present invention, the rechargeable lithium battery has improved capacity, efficiency, and cycle-life characteristics.

BRIEF DESCRIPTION OF THE DRAWING

The accompanying drawings, together with the specification, illustrate exemplary embodiments of the present invention, and, together with the description, serve to explain the principles of the present invention.

FIG. 2 is a graph showing cycle-life characteristics of various battery cells.

DETAILED DESCRIPTION

Figure 1:
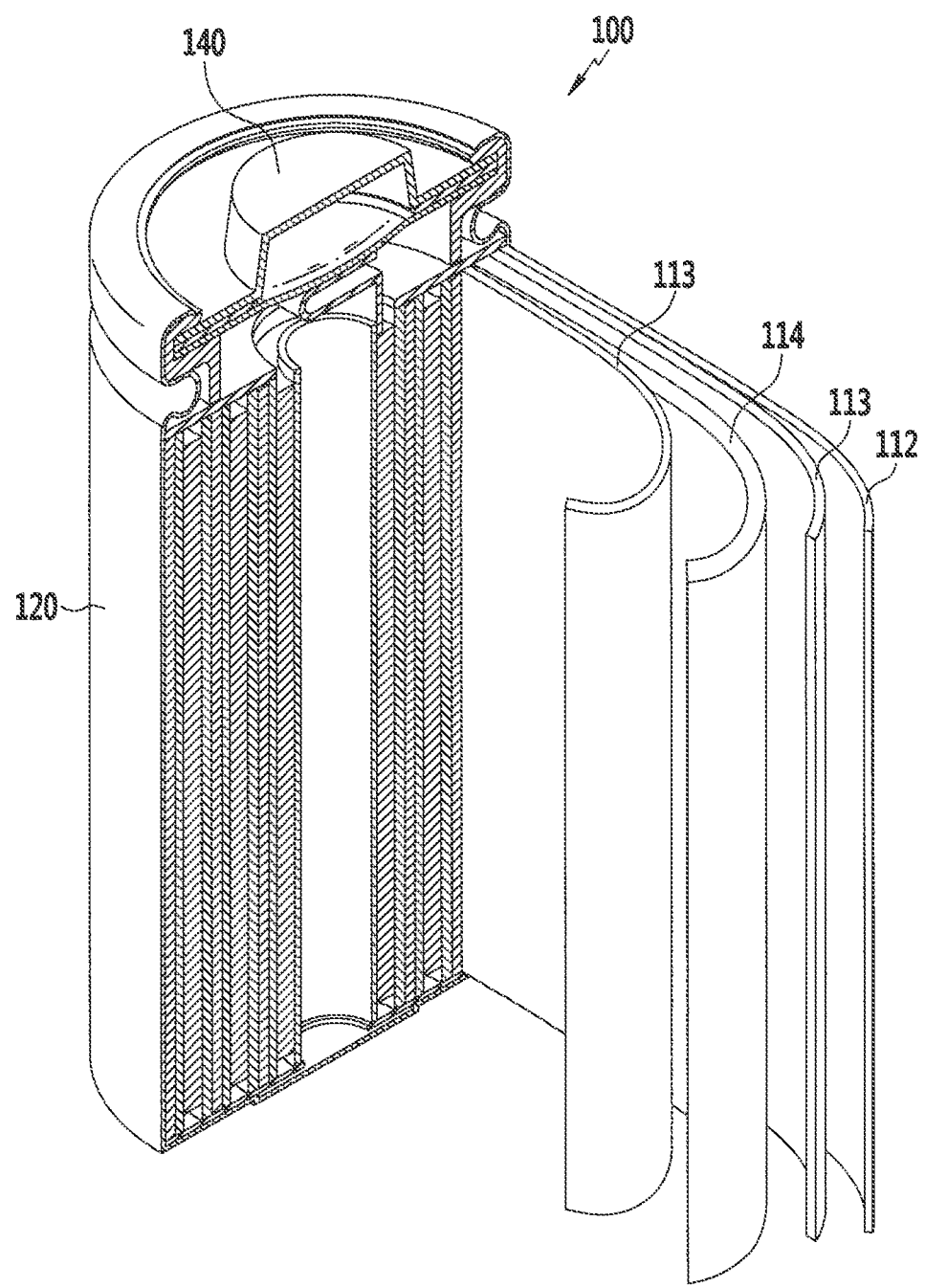
FIG. 1 is a schematic and exploded perspective view of a rechargeable lithium battery according to one embodiment of the present invention.

Exemplary embodiments of the present invention will hereinafter be described in detail. However, these embodiments are only exemplary, and the present invention is not limited thereto. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween.

One embodiment of the present invention provides a rechargeable lithium battery including a negative electrode including a silicon-based negative active material; a positive electrode including a positive active material including a sacrificial positive active material; and a non-aqueous electrolyte. The sacrificial positive active material is selected from lithium nickel oxide, lithium molybdenum oxide, and a combination thereof.

The silicon-based negative active material may be used as a high-capacity negative electrode material. In general a carbon-based negative active material has lower capacity and efficiency than a positive active material. However, the silicon-based negative active material may be balanced by the positive active material in terms of capacity and efficiency in the rechargeable lithium battery. However, the silicon-based negative active material may have a problem of efficiency deterioration due to irreversibility when used alone.

The irreversibility problem described above may be solved (or lessened) by using the positive electrode including the sacrificial positive active material when the high-capacity silicon-based negative active material is used to improve capacity of the rechargeable lithium battery. Accordingly, the rechargeable lithium battery may have improved cycle-life characteristics by solving (or lessening) the irreversibility problem of the silicon-based negative active material.

The positive electrode includes the sacrificial positive active material and, thus, may compensate for efficiency deterioration of the negative electrode due to irreversibility and may improve cycle-life of the rechargeable lithium battery, but, when the sacrificial positive active material is included, the irreversibility of the positive electrode is increased and the rechargeable lithium battery has decreased capacity as a result. However, the irreversible capacity decrease of the positive electrode due to the presence of the sacrificial positive active material corresponds to a portion of the capacity that is relatively in excess of that of the negative electrode and, thus, does not substantially contribute to the capacity of the rechargeable lithium battery. Thus, when a positive active material is used instead of (e.g., in place of) the sacrificial positive active material, additional improvements in the capacity of the rechargeable lithium battery cannot be obtained. Furthermore, when the silicon-based negative active material would otherwise cause volume expansion/contraction during charging and discharging, the positive electrode may suppress (or reduce) problems associated with contraction by lowering a cut-off voltage of the negative electrode during discharge. Accordingly, the positive electrode including the sacrificial positive active material may partially sacrifice non-used capacity (e.g., excess capacity) while improving cycle-life characteristics of the rechargeable lithium battery without deteriorating (or substantially deteriorating) capacity.

The sacrificial positive active material may be a material having high capacity but high irreversibility, for example, a lithium nickel oxide, a lithium molybdenum oxide, and the like. The sacrificial positive active material may deintercalate Li ions at a voltage from about 2.75V to about 4.6V during charging of the rechargeable lithium battery. For example, the sacrificial positive active material may be selected from $Li_2NiO_2$, $Li_2MoO_3$, and a combination thereof.

The sacrificial positive active material may be included in an amount of more than 0 and less than or equal to 20 wt %, for example, from about 5 wt % to about 15 wt %, and from about 5 wt % to about 10 wt %, based on 100 wt % of the positive active material.

When the sacrificial positive active material is included within the foregoing ranges, capacity and cycle-life characteristics of the rechargeable lithium battery may be concurrently (e.g., simultaneously) improved.

The positive active material may further include a positive active material other than the sacrificial positive active material. According to one embodiment of the present invention, the positive active material may be a mixture of the sacrificial positive active material and the positive active material, e.g., a lithiated intercalation compound. That is, the positive active material may be a mixture of the sacrificial positive active material and the intercalation compound.

The lithiated intercalation compound may be $Li_aA_{1-b}B_bD_2$ ($0.90 \le a \le 1.8$ and $0 \le b \le 0.5$); $Li_aE_{1-b}B_bO_{2-c}D_c$ ($0.90 \le a \le 1.8$, $0 \le b \le 0.5$, $0 \le c \le 0.05$); $LiE_{2-b}B_bB_bO_{4-c}D_c$ ($0 \le b \le 0.5$, $0 \le c \le 0.05$); $Li_aNi_{1-b-c}Co_bB_cD_\alpha$ ($0.90 \le a \le 1.8$, $0 \le b \le 0.5$, $0 \le c \le 0.05$, $0 < \alpha \le 2$); $Li_aNi_{1-b-c}Co_bB_cO_{2-\alpha}F_\alpha$ ($0.90 \le a \le 1.8$, $0 \le b \le 0.5$, $0 \le c \le 0.05$, $0 < \alpha < 2$); $Li_aNi_{1-b-c}Co_bB_cO_{2-\alpha}F_2$ ($0.90 \le a \le 1.8$, $0 \le b \le 0.5$, $0 \le c \le 0.05$, $0 < \alpha < 2$); $Li_aNi_{1-b-c}Mn_bB_cD_\alpha$ ($0.90 \le a \le 1.8$, $0 \le b \le 0.5$, $0 \le c \le 0.05$, $0 < \alpha \le 2$); $Li_aNi_{1-b-c}Mn_bB_cO_{2-\alpha}F_\alpha$ ($0.90 \le a \le 1.8$, $0 \le b \le 0.5$, $0 \le c \le 0.05$, $0 < \alpha < 2$); $Li_aNi_{1-b-c}Mn_bB_cO_{2-\alpha}F_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $QO_2$; $QS_2$; $LiQS_2$; $V_2O_5$; $LiV_2O_5$; $LiIO_2$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above formulas, A is selected from the group consisting of Ni, Co, Mn, and a combination thereof; B is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; and J is selected from the group consisting of V, Cr, Mn, Co, Ni, Cu, and a combination thereof.

In some embodiments, the silicon-based negative active material may be mixed with other conventional negative active materials, because, although the silicon-based negative active material has high capacity, its efficiency deteriorates due to irreversibility when used alone.

The silicon-based negative active material may be included in an amount of more than 0 and less than or equal to 10 wt %, for example, from about 3 wt % to about 5 wt % based on 100 wt % of the negative active material. When the silicon-based negative active material is included within the foregoing ranges, capacity and cycle-life characteristics of the rechargeable lithium battery may be concurrently (e.g., simultaneously) improved.

The silicon-based negative active material may be, for example, silicon oxide represented by $SiO_x$ (wherein, $0.5 \le x \le 1.5$).

In one embodiment, the negative electrode of the rechargeable lithium battery may include a mixture of a silicon-based negative active material and a carbon-based negative active material.

In some embodiments, the carbon-based negative active material is a material that reversibly intercalates/deintercalates lithium ions and may be any generally-used carbon-based negative active material for lithium on rechargeable batteries. Examples of the carbon-based negative active material may include crystalline carbon, amorphous carbon, or a combination thereof. The crystalline carbon may be non-shaped or sheet, flake, spherical, or fiber shaped natural graphite or artificial graphite. The amorphous carbon may be a soft carbon, a hard carbon, a mesophase pitch carbonized product, fired coke, and the like.

According to an embodiment of the present invention, the rechargeable lithium battery may have excellent capacity and cycle-life characteristics by using the silicon-based negative active material included in the negative electrode and the sacrificial positive active material included in the positive electrode in an appropriate ratio.

For example, the silicon-based negative active material may be included in an amount of more than 0 and less than or equal to 10 wt % based on 100 wt % of the negative active material, and the sacrificial positive active material may be included in an amount from about 5 wt % to about 15 wt % based on 100 wt % of positive active material. In such an embodiment, a rechargeable lithium battery having suitable (or desired) capacity and cycle-life characteristics may be realized.

The rechargeable lithium battery may further include a separator. The rechargeable lithium battery may be classified as a lithium on battery, a lithium on polymer battery, or a lithium polymer battery according to the kind of separator and the kind of electrolyte used therein. The rechargeable lithium batteries may have a variety of shapes and sizes, and examples include cylindrical, prismatic, coin, and pouch-type batteries. The rechargeable lithium batteries may be thin film batteries or may be rather bulky in size. Structures and fabricating methods for lithium on batteries pertaining to the present invention are well known in the art, and further description thereof will be omitted herein.

FIG. 1 is an exploded perspective view of a rechargeable lithium battery according to one embodiment. Referring to FIG. 1, a rechargeable lithium battery 100 includes a negative electrode 112, a positive electrode 114, and a separator 113 interposed between the negative electrode 112 and the positive electrode 114, an electrolyte impregnated in the negative electrode 112, the positive electrode 114, and the separator 113, and a sealing member 140 sealing the battery case 120. Such a rechargeable lithium battery 100 is fabricated by sequentially stacking the negative electrode 112, positive electrode 114, and separator 113, spiral-winding the resultant, and accommodating the spiral-wound body in the battery case 120.

The negative electrode includes a current collector and a negative active material layer on the current collector. The negative active material layer includes a negative active material The negative active material is the same (or substantially the same) as described above.

The negative active material layer further includes a binder, and optionally a conductive material.

The binder improves binding properties of negative active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the negative active material.

The conductive material is included to improve electrode conductivity. Any suitable electrically conductive material may be used as a conductive material unless it causes a chemical change to a component of the rechargeable lithium battery. Examples of the conductive material include natural graphite, artificial graphite, carbon black, acetylene black, ketjen black, a carbon fiber, a metal powder or a metal fiber including copper, nickel, aluminum, silver, and the like, a polyphenylene derivative, or mixtures thereof.

The current collector may be selected from the group consisting of a copper foil, a nickel foil, a stainless steel foil, a titanium foil, a nickel foam, a copper foam, a polymer substrate coated with a conductive metal, and combinations thereof.

The positive electrode includes a current collector and a positive active material layer on the current collector.

The positive active material is the same (or substantially the same) as described above.

The positive active material layer further includes a binder and a conductive material.

The binder improves binding properties of the positive active material particles to one another and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like but are not limited thereto.

The conductive material improves electrical conductivity of the negative electrode. Any suitable electrically conductive material can be used as a conductive material unless it causes a chemical change to a component of the rechargeable lithium battery. Examples of the conductive material include at least one selected from natural graphite, artificial graphite, carbon black, acetylene black, ketjen black, a carbon fiber, a metal powder or a metal fiber including copper, nickel, aluminum, silver, and the like. A conductive material such as a polyphenylene derivative and the like may be included as the conductive material or mixed with one or more of the other foregoing examples to form the conductive material.

The current collector may be Al but it is not limited thereto.

The negative electrode and the positive electrode may each be manufactured by a method including mixing an active material, a binder, or the like in a solvent to prepare an active material composition, and coating the composition on a current collector. The electrode manufacturing method is well known, and thus is not described in more detail in the present specification. The solvent may include N-methylpyrrolidone or water, and the like but it is not limited thereto.

The solvent includes N-methylpyrrolidone and the like, but it is not limited thereto.

The non-aqueous organic solvent serves as a medium for transmitting ions taking part in the electrochemical reaction of the battery.

Examples of the non-aqueous organic solvent may include a carbonate-based, ester-based, ether-based, ketone-based, alcohol-based, and aprotic solvents. The carbonate-based solvent may include diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran and the like, and the ketone-based solvent may include cyclohexanone, and the like. The alcohol-based solvent may include ethanol, isopropyl alcohol, and the like. Aprotic solvents include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, its mixture ratio can be controlled in accordance with desirable or suitable performance of the battery.

The carbonate-based solvent may include a mixture of a cyclic carbonate and a linear carbonate. In some embodiments, the cyclic carbonate and the linear carbonate are mixed together in a volume ratio from about 1:1 to about 1:9, which may enhance performance of an electrolyte including the carbonate-based solvent.

In addition, the non-aqueous organic solvent may be prepared by further adding the aromatic hydrocarbon-based organic solvent to the carbonate-based solvent. In some embodiments, the carbonate-based solvent and the aromatic hydrocarbon-based organic solvent are mixed together in a volume ratio from about 1:1 to about 30:1.

The aromatic hydrocarbon-based organic solvent may be an aromatic hydrocarbon-based compound represented by the following Chemical Formula 1,

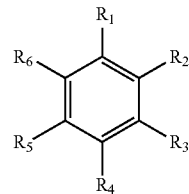

[Chemical Formula 1]

In Chemical Formula 1, $R_1$ to $R_6$ are each independently a hydrogen, a halogen, a C1 to C10 alkyl group, a C1 to C10 haloalkyl group, or a combination thereof.

The aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by the following Chemical Formula 2 in order to improve cycle-life of a battery.

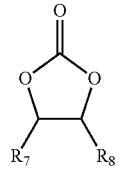

[Chemical Formula 2]

In Chemical Formula 2, $R_7$ and $R_8$ are each independently a hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$) or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used for improving cycle life may be adjusted within an appropriate range.

According to embodiments of the present invention, the non-aqueous organic solvent may include a conventional material without a particular limit, but when the sacrificial positive active material includes $Li_2MoO_3$ and the like, the sacrificial positive active material may elute molybdenum (Mo) at a high temperature. Herein, when dimethyl carbonate (DMC) is used as the non-aqueous organic solvent, the elution problem of the sacrificial positive active material at a high temperature may be further deteriorated (or exacerbated). Accordingly, in some embodiments, the non-aqueous organic solvent does not include dimethyl carbonate (DMC). For example, in some embodiments, the aqueous organic solvent is free or substantially free of dimethyl carbonate.

The lithium salt is dissolved in the non-aqueous solvent and supplies lithium ions to operate the rechargeable lithium battery and improves lithium on transfer between the positive and negative electrodes.

The lithium salt includes at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato)borate, LiBOB), or a combination thereof.

When the lithium salt is a non-fluorine-based salt, elution of the sacrificial positive active material at a high temperature may be suppressed or reduced. For example, the lithium salt may be selected from $LiClO_4$, $LiB(C_2O_4)_2$ (lithium bis(oxalato)borate; LiBOB), or a combination thereof.

The lithium salt may be used in a concentration from about 0.1M to about 2.0M. When the lithium salt is included within the above concentration range, it may improve electrolyte performance and lithium on mobility due to suitable (or optimal) electrolyte conductivity and viscosity.

The separator 113 may include any suitable materials commonly used in conventional lithium batteries as long as it separates the negative electrode 112 from the positive electrode 114 and provides a passage for transporting lithium ions. In other words, the separator may have a low resistance to on transport and excellent impregnation characteristics with respect to the electrolyte. For example, the separator may be selected from glass fiber, polyester, TEFLON (tetrafluoroethylene), polyethylene, polypropylene, polytetrafluoroethylene (PTFE), and a combination thereof. The separator may have a form of a non-woven fabric or a woven fabric. For example, in lithium ion batteries, polyolefin-based polymer separators, such as polyethylene, polypropylene or the like, are mainly used. In order to ensure that the separator has suitable heat resistance or mechanical strength, a coated separator including a ceramic component or a polymer material may be used. For example, the separator may have a mono-layered or multi-layered structure.

The following examples illustrate the present invention in more detail. These examples, however, should not be interpreted as limiting the scope of the present invention.

Examples

Preparation Example 1

Fabrication of Positive Electrode

A positive active material was prepared by mixing $LiCoO_2$ and $Li_2MoO_3$ (in a composition ratio according to the following Table 1), SOLEF® 6020 as a binder, and denka black as a conductive material in a mass composition ratio of 96:2:2 in NMP (n-methyl-2-pyrrolidone) as a solvent to prepare slurry. SOLEF® is a polyvinylidene fluoride polymer available from Solvay Specialty Polymers, Brussels, Belgium. SOLEF® is a registered trademark of Solvay Et Cie. Corporation, Brussels, Belgium. The slurry was coated on a 12 μm-thick aluminum current collector. The coated aluminum current collector was dried and compressed to fabricate a positive electrode.

Preparation Example 2

Fabrication of Negative Electrode

A negative active material was prepared by mixing graphite and silicon oxide ($SiO_x$, x=1) powder (available from Shin-Etsu chemicals Co. Ltd.) (in a composition ratio according to the following Table 1), carboxylmethyl cellulose (CMC) and styrene butadiene rubber (SBR) as a binder in a mass composition ratio of 98:1:1 in water as a mixing solvent to prepare a slurry. The slurry was coated on a 12 μm-thick copper current collector. The coated copper current collector was dried and compressed in a manner similar to that of the positive electrode to fabricate a negative electrode.

Comparative Example 1

Fabrication of Positive Electrode

A positive electrode was fabricated according to the same method as Preparation Example 1 except without including the sacrificial positive active material, $Li_2MoO_3$, included in Preparation Example 1.

Experimental Example

Cell Evaluation

The positive and negative electrodes were assembled to fabricate a pouch-type full cell. The cell was evaluated regarding charge and discharge characteristics and cycle-life characteristics.

FIG. 2 shows cycle-life characteristics of the battery cells.

Herein, an electrolyte solution was prepared by mixing 1.3M $LiPF_6$ and ethylene carbonate/ethylmethyl carbonate/dimethyl carbonate (in a mole ratio of 3:3:4).

Evaluation condition: charge 0.2 C, 4.35V, constant-current constant voltage (CCCV; 0.05 C cut off); and discharge 0.2 C, 2.75V, and cut off (1 C=180mAh/g).

TABLE 1

| | Positive electrode [based on 100 wt% of positive active material] | | Negative electrode [based on 100 wt% of negative active material] | | Charge capacity | Discharge capacity | Efficiency | Capacity retention (100 cycle) |
|---|---|---|---|---|---|---|---|---|
| | $LiCoO_2$ | $Li_2MoO_3$ | graphite | $SiO_x$ | (mAh/g) | (mAh/g) | (%) | |
| Example 1 | 95 | 5 | 97 | 3 | 183 | 163 | 89 | 92% |
| Example 2 | 90 | 10 | 97 | 3 | 185 | 155 | 84 | 90% |
| Example 3 | 85 | 15 | 97 | 3 | 188 | 147 | 78 | 93% |
| Example 4 | 80 | 20 | 97 | 3 | 190 | 139 | 73 | — |
| Exanjple 5 | 70 | 30 | 97 | 3 | 195 | 123 | 63 | — |
| Example 6 | 60 | 40 | 97 | 3 | 200 | 107 | 54 | — |
| Example 7 | 95 | 5 | 95 | 5 | 183 | 163 | 88 | 90% |

TABLE 1-continued

|  | Positive electrode [based on 100 wt% of positive active material] | | Negative electrode [based on 100 wt% of negative active material] | | Charge capacity (mAh/g) | Discharge capacity (mAh/g) | Efficiency (%) | Capacity retention (100 cycle) |
|---|---|---|---|---|---|---|---|---|
|  | LiCoO$_2$ | Li$_2$MoO$_3$ | graphite | SiO$_x$ |  |  |  |  |
| Example 8 | 90 | 10 | 95 | 5 | 185 | 155 | 84 | 90% |
| Example 9 | 85 | 15 | 95 | 5 | 188 | 147 | 78 | 95% |
| Example 10 | 90 | 10 | 90 | 10 | 185 | 155 | 84 | 88% |
| Example 11 | 90 | 10 | 80 | 20 | 185 | 148 | 80 | — |
| Comparative Example 1 | 100 | 0 | 95 | 5 | 180 | 160 | 89 | 87% |

As shown in Table 1 and FIG. 2, increasing the amount of sacrificial positive active material included in the positive electrode increases the charge capacity of the resultant cell. However, the sacrificial positive active material has irreversible characteristics and, thus, including the sacrificial positive active material in the positive electrode decreases discharge capacity and partially decreases battery efficiency of the resultant battery.

In addition, when the sacrificial positive active material and the silicon-based negative active material were included within an appropriate or suitable range according to an exemplary embodiment of the present invention (e.g., Example 9), cycle-life characteristics of the resultant battery cell were improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery, comprising:
   a negative electrode comprising a negative active material comprising a silicon-based negative active material in an amount of about 3 wt % to about 5 wt % based on 100 wt % of the negative active material;
   a positive electrode comprising a positive active material comprising a sacrificial positive active material selected from lithium nickel oxides, lithium molybdenum oxides, and combinations thereof, wherein the sacrificial positive active material is included in an amount of about 5 wt % to about 15 wt % based on 100 wt % of the positive active material; and
   a non-aqueous electrolyte.

2. The rechargeable lithium battery of claim 1, wherein the sacrificial positive active material is adapted to deintercalate Li ions at a voltage from about 2.75V to about 4.3V.

3. The rechargeable lithium battery of claim 1, wherein the sacrificial positive active material is selected from Li$_2$NiO$_2$, Li$_2$MoO$_3$, and a combination thereof.

4. The rechargeable lithium battery of claim 1, wherein the silicon-based negative active material comprises silicon oxide represented by SiOx and wherein 0.5≤x≤1.5.

5. The rechargeable lithium battery of claim 4, wherein the silicon-based negative active material is mixed with a carbon-based negative active material.

6. The rechargeable lithium battery of claim 5, wherein the carbon-based negative active material comprises graphite.

7. The rechargeable lithium battery of claim 1, wherein the positive active material comprises a mixture of a lithiated intercalation compound and the sacrificial positive active material.

8. The rechargeable lithium battery of claim 1, wherein the non-aqueous electrolyte comprises a lithium salt and a non-aqueous organic solvent.

9. The rechargeable lithium battery of claim 8, wherein the lithium salt comprises a non-fluorine-based salt.

10. The rechargeable lithium battery of claim 9, wherein the lithium salt is selected from LiClO$_4$, LiB(C$_2$O$_4$)$_2$ (lithium bis(oxalato) borate; LiBOB), a supporting electrolytic salt thereof, and a combination thereof.

11. The rechargeable lithium battery of claim 8, wherein the non-aqueous organic solvent is selected from dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, dibutyl ether, tetraglyme, diglyme, dimethoxyethane, 2-methyltetrahydrofuran, tetrahydrofuran, cyclohexanone, nitriles, dimethylformamide, dioxolanes, sulfolanes, and a combination thereof.

12. The rechargeable lithium battery of claim 8, wherein the non-aqueous organic solvent does not include dimethyl carbonate.

* * * * *